(12) United States Patent
Uphus et al.

(10) Patent No.: US 11,781,960 B2
(45) Date of Patent: Oct. 10, 2023

(54) MEASURING DEVICE AND METHOD FOR DETERMINING RHEOLOGICAL PROPERTIES OF A VISCOUS, POLYMERIC MASS

(71) Applicant: VMI HOLLAND B.V., Epe (NL)

(72) Inventors: Reinhard Uphus, Epe (NL); Peng Chea, Epe (NL); Martinus Regterschot, Epe (NL)

(73) Assignee: VMI HOLLAND B.V., Epe (NL)

( * ) Notice: Subject to any disclaimer, the term of this patent is extended or adjusted under 35 U.S.C. 154(b) by 274 days.

(21) Appl. No.: 17/312,824

(22) PCT Filed: Dec. 10, 2019

(86) PCT No.: PCT/EP2019/084507
§ 371 (c)(1),
(2) Date: Jun. 10, 2021

(87) PCT Pub. No.: WO2020/120507
PCT Pub. Date: Jun. 18, 2020

(65) Prior Publication Data
US 2022/0146392 A1 May 12, 2022

(30) Foreign Application Priority Data
Dec. 14, 2018 (NL) ..................................... 2022209

(51) Int. Cl.
*G01N 11/14* (2006.01)
*G01N 11/00* (2006.01)

(52) U.S. Cl.
CPC ...... *G01N 11/14* (2013.01); *G01N 2011/0006* (2013.01); *G01N 2011/0026* (2013.01)

(58) Field of Classification Search
CPC ........ G01N 11/14; G01N 11/10; G01N 11/16; G01N 11/162; G01N 11/142; G01N 2011/145; G01N 11/165; G01N 11/167
See application file for complete search history.

(56) References Cited

U.S. PATENT DOCUMENTS 3,545,257 A * 12/1970 Zangger ................ G01N 11/14
73/54.34
4,095,461 A * 6/1978 Starita ................. G01N 11/142
73/815

(Continued)

FOREIGN PATENT DOCUMENTS

DE 3642757 A1 * 7/1987
EP 0043892 A1 * 1/1982
(Continued)

OTHER PUBLICATIONS

Espacenet Machine Translation of DE 3642757 A1 Which Originally Published on Jul. 16, 1987. (Year: 1987).*
(Continued)

*Primary Examiner* — David A. Rogers
(74) *Attorney, Agent, or Firm* — WORKMAN NYDEGGER

(57) ABSTRACT

The invention relates to a measuring device and a method for determining rheological properties of a viscous, polymeric mass, wherein the measuring device comprises a rheometer with a container containing the mass and a rotation element that is positionable inside the container, wherein the measuring device provides a relative between the rotation element and the container about an rotation axis that defines an axial direction parallel to the rotation axis and a radial direction perpendicular to the rotation axis, wherein the measuring device comprises one or more normal force sensors for detecting at least a component of the normal force that is exerted onto the container or the rotation (Continued)

element in the axial direction and a radial force sensor for detecting a radial force exerted onto the container in the radial direction.

30 Claims, 5 Drawing Sheets

(56) References Cited

U.S. PATENT DOCUMENTS

| | | | | |
|---|---|---|---|---|
| 4,173,142 | A | 11/1979 | Heinz | |
| 4,794,788 | A * | 1/1989 | Masters | G01N 11/165 73/54.27 |
| 4,953,406 | A * | 9/1990 | Putman | G01N 33/445 374/48 |
| 5,167,143 | A * | 12/1992 | Brookfield | G01N 11/14 73/54.23 |
| 5,610,325 | A * | 3/1997 | Rajagopal | G01N 11/142 73/54.38 |
| 6,167,752 | B1 * | 1/2001 | Raffer | G01N 11/142 73/843 |
| 6,218,751 | B1 * | 4/2001 | Bohlin | G01N 11/14 310/91 |
| 6,681,617 | B1 * | 1/2004 | Putman | G01N 11/142 73/54.27 |
| 6,776,028 | B1 * | 8/2004 | Lukay | G01N 11/14 73/54.38 |
| 6,978,662 | B2 * | 12/2005 | Platzek | G01N 11/14 73/54.23 |
| 7,444,855 | B2 * | 11/2008 | Cottais | G01N 11/142 73/54.39 |
| 9,255,872 | B2 * | 2/2016 | Raffer | G01N 11/14 |
| 10,036,695 | B2 * | 7/2018 | Belitsch | G01N 11/14 |
| 2006/0081038 | A1 * | 4/2006 | Platzek | G01N 11/14 73/54.23 |
| 2008/0022758 | A1 * | 1/2008 | Cottais | G01N 11/142 73/54.32 |
| 2008/0047327 | A1 * | 2/2008 | Uphus | G01N 11/14 73/54.11 |
| 2009/0178471 | A1 * | 7/2009 | Uphus | G01N 11/14 73/54.11 |
| 2010/0142310 | A1 * | 6/2010 | Uphus | B29B 7/603 366/132 |
| 2011/0100098 | A1 | 5/2011 | Lauger et al. | |
| 2022/0011210 | A1 * | 1/2022 | Krenn | F16C 32/0611 |

FOREIGN PATENT DOCUMENTS

| | | |
|---|---|---|
| EP | 2063249 A2 | 5/2009 |
| EP | 2078949 A2 | 7/2009 |

OTHER PUBLICATIONS

Search Report and Written Opinion from corresponding Dutch Application No. NL2022209, dated Sep. 10, 2019.
International Search Report and Written Opinion from PCT Application No. PCT/EP2019/084507, dated Mar. 5, 2020.

* cited by examiner

MEASURING DEVICE AND METHOD FOR DETERMINING RHEOLOGICAL PROPERTIES OF A VISCOUS, POLYMERIC MASS

BACKGROUND

The invention relates to a measuring device and a method for determining rheological properties of a viscous, polymeric mass.

It is known to use rotational rheometers to measure rheological properties of liquids, such as the viscosity. EP 2 078 949 A2 discloses the use of a rheometer for measuring the viscosity of a highly viscous mass. The known rheometer has a measuring chamber for receiving the highly viscous mass and a cone that is rotatable inside the measuring chamber to rotate the highly viscous mass. The viscosity is derived from the development of the torque that is required to rotate the cone. To obtain correct measurements about the highly viscous mass, it is critical that the highly viscous mass rotates together with the cone and does not slip with respect to the inner surface of the chamber. To ensure proper adherence and/or friction between the highly viscous mass and the cone, the measuring chamber is closed, and the highly viscous mass is pressurized to a pressure that is considerably higher than the atmospheric pressure.

U.S. Pat. No. 4,173,142 A discloses a rotary viscometer for measuring high-polymer substances. The rotary viscometer operates on a plate-to-cone or plate-to-plate principle and is provided with a chamber containing the high-polymer substance whose viscosity is to be measured, upper and lower counter rotating measuring surfaces within the chamber and a force measuring device located within the housing for measuring the cumulative force acting on one of said measuring surfaces normal to the respective measuring surface.

US 2011/0100098 A discloses a rheometer with a plurality of normal force sensors, yet without a container. Said rheometer is therefore unsuitable for containing a pressurized, highly viscous mass.

EP 2 063 249 A2 discloses a rheometer with a material holding vessel for containing ingredients at a controlled temperature or controlled pressure and two mixer elements that are rotatable within the cavity of the material holding vessel. This known rheometer does not have normal force sensor. It does however have means to resolve the load imparted by the ingredients on the shaft in the axial direction and/or the radial direction by detecting the deflection of said shaft in the respective directions.

SUMMARY OF THE INVENTION

It has been found that, in addition to the normal forces, the relative rotation between the rotation element and the measuring chamber also causes a slight increase in the forces measured in the radial direction. This slight increase can be detected and used, in combination with the detected normal force, for calculating various rheological characteristics of the viscous, polymeric mass. A disadvantage of the known rotational rheometer as disclosed in EP 2 078 949 A2 is that, although it has a pressure sensor, said pressure sensor is only arranged to measure the pressure prior to the rotation of the rotation element. Moreover, EP 2 078 949 A2 and EP 2 063 249 A2 do not disclose any normal force sensors. U.S. Pat. No. 4,173,142 A and EP 2 063 249 A2 discloses a force measuring device for measuring the normal force but fails to disclose a radial force sensor.

A further disadvantage of EP 2 078 949 A2 is that the high pressure itself contributes to or influences the behavior of the highly viscous mass, which could render some of the measured rheological properties inaccurate. In particular, because of the closed nature of the measuring chamber, the behavior of the highly viscous mass is inconsistent, in particular towards the circumferential wall of the measuring chamber where the radial force is detected. A higher viscosity requires a higher pressure. Hence, the negative effects of the pressure increase with increasingly higher viscosities. The viscometer of U.S. Pat. No. 4,173,142 A, depending on the amount of pressurization, if any, will experience the same disadvantage.

In EP 2 063 249 A2, the measured load on the shaft has no relation to the radial force exerted onto the container in the radial direction. Furthermore, EP 2 063 249 A2 does not recognize the inconsistent behavior of the ingredients, when pressurized to a high pressure, towards or near the circumferential wall of the container.

It is an object of the present invention to provide a measuring device and a method for determining rheological properties of a viscous, polymeric mass, wherein the measuring capabilities of the measuring device can be improved.

According to a first aspect, the invention provides a measuring device for determining rheological properties of a viscous, polymeric mass, wherein the measuring device comprises a rotational rheometer with a container for containing the viscous, polymeric mass and a rotation element that is positionable inside the container, wherein the measuring device is arranged for providing a relative rotation between the rotation element and the container about a rotation axis that defines an axial direction parallel to the rotation axis and a radial direction perpendicular to the rotation axis, wherein the measuring device comprises one or more normal force sensors for detecting at least a component of a normal force that is exerted in the axial direction onto the container or the rotation element and a radial force sensor for detecting a radial force exerted onto the container in the radial direction.

The relative rotation causes the viscous, polymeric mass to shear, wherein during the shearing the viscous, polymeric mass exerts a normal force in the axial direction onto the container, a radial force on the circumferential wall and an internal force in the direction of the flow. The detection signals representative of the normal force and the radial force can in combination be used to calculate fluid characteristics of the viscous, polymeric mass, such as the 'first normal stress difference' and the 'second normal stress difference'.

In one preferred embodiment the radial force sensor is located at or in the circumferential wall. Hence, the radial force can be measured directly at the circumferential wall.

In another preferred embodiment the radial force sensor is a pressure sensor. The pressure sensor can measure the force, typically expressed in Newton, per unit area, typically expressed in square meters, resulting in a pressure value, typically expressed in Pascal (Pa) or Bar.

In another preferred embodiment one of the calculations involves subtracting the radial force based on detection signals from the radial force sensor indicative of said radial force from the normal force exerted onto the container or the rotation element in the axial direction at the outer diameter. The aforementioned calculation results in the second normal stress difference 'N2'.

More preferably, one or more characteristics comprise one or more of the 'first normal stress difference' and the 'second normal stress difference'. These characteristics can be used to calculate or predict other characteristics, such as die swell.

In another embodiment the one or more normal force sensors comprises a first normal force sensor for detecting at least a component of the normal force that is exerted in the axial direction onto the container or the rotation element at a first radial distance from the rotation axis and a second normal force sensor for detecting at least a component of the normal force that is exerted in the axial direction onto the container or the rotation element at a second radial distance from the rotation axis greater than the first radial distance. The normal force detection has proven to be unreliable because of the effects of pressurization and/or the boundaries of the container. In particular the area radially outside of the rotation element can be problematic as this marks the transition between an area of viscous, polymeric mass that is being rotated by the rotation of the rotation element and the remaining area in which the viscous, polymeric mass is rotating slower or not rotating at all. A normal force sensor arranged at this transition will inevitably overlap with both areas and thus produce unreliable detection results. Moreover, when the normal force sensor is located close to the radial boundaries of the container, the detection results will become inconsistent because of pressure build-up against said radial boundaries.

By detecting the normal force with at least two normal force sensors at two different radial distances, as proposed by the present invention, the normal force at other radial distances can be predicted, calculated, interpolated and/or extrapolated. As such, the normal force can be determined for radial distances where the actual detection of the normal force is difficult or unreliable.

In a preferred embodiment the plurality of normal force sensors further comprises a third normal force sensor for detecting at least a component of the normal force that is exerted in the axial direction onto the container or the rotation element at a third radial distance from the rotation axis greater than the second radial distance. The detected normal force at the third radial position can be used to more accurately predict, calculate, interpolate and/or extrapolate the normal force at other radial distances. In particular, it has been found that the normal force behaves in an exponential relationship with the radial distance. Hence, the normal force at the three radial positions can be used to determine the parameters of this exponential relationship.

In a further embodiment the rotation element has an outer diameter, wherein the control unit is arranged for calculating the normal force exerted onto the container in the axial direction at the outer diameter of the rotation element by means of interpolation or extrapolation based on detection signals from the plurality of normal force sensors indicative of the normal force at the respective radial distances from the rotation axis. As previously discussed, the normal force at the outer diameter of the rotation element can not be reliably determined by a normal force sensor. Hence, said value is interpolated or extrapolated based on the detection signals from the normal force sensors.

In an embodiment thereof the plurality of normal force sensors are all arranged for detecting the normal force between the rotation axis and the outer diameter, wherein the control unit is arranged for calculating the normal force exerted onto the container or the rotation element in the axial direction at the outer diameter of the rotation element by means of extrapolation. By arranging all of the normal force sensors within the area between the rotation axis and the outer diameter, contamination of the detection results from the normal force sensors by the inconsistent behaviour of the viscous, polymeric mass outside of the outer diameter can be prevented.

In a further embodiment thereof the normal force has an exponential relationship with the radial distances that as on a logarithmic scale can be presented as a linear equation with a slope and an intercept, wherein the control unit is arranged for using the normal force detected by the first normal force sensor and the normal force detected by the second normal force sensor to determine the slope and the intercept of the linear equation, wherein the control unit is further arranged for calculating the normal force exerted onto the container or the rotation element in the axial direction at the outer diameter of the rotation element via the linear equation. Hence, the exponential relationship can be simplified to a linear relationship, thereby only requiring the normal force from two different radial distances to calculate the normal force at any other radial position.

In another embodiment the rotation element has an outer diameter, wherein the container comprises a circumferential wall extending concentrically about the rotation axis, wherein the circumferential wall of the container has an inner diameter concentric to the outer diameter of the rotation element, wherein the inner diameter is larger than the outer diameter to form a clearance between the rotation element and the circumferential wall. The circumferential wall causes unpredictable and/or inconsistent behaviour of the viscous, polymeric mass, in particular at or near said circumferential wall. This problem occurs especially at high pressure, i.e. pressure in excess of thirty Bar or in excess of fifty Bar. The clearance effectively reduces this negative effect.

However, when the clearance becomes too large, a part of the viscous, polymeric mass will rotate slower or stop rotating at all. This also causes unpredictable and/or inconsistent behaviour of the viscous, polymeric mass, especially at the transition from the rotating part and the non-rotating part thereof. Hence, it is preferred to dimension the clearance within a range in which a balance is obtained between the reduction of the negative effects of the circumferential wall on the detection results and the introduction of new negative effects caused by rotation speed difference in the viscous, polymeric mass. It has been found that when the clearance in the radial direction has a size in the range of two to fifty percent of the outer diameter, the detection results can be improved. When the clearance in the radial direction has a size in the range of two to fifteen percent of the outer diameter, the detection results can be further improved. In a practical embodiment with an outer diameter of approximately fifty millimeters, it is preferred that the clearance in the radial direction has a size in the range of one to five millimeters.

In another embodiment the container comprises a first end wall that closes the circumferential wall in the axial direction at one side of the rotation element and a second end wall that closes the circumferential wall in the axial direction at an opposite side of the rotation element, wherein each one of the one or more normal force sensors is located at or in one of the end walls of the container. Preferably, the normal force sensors are all located in the same end wall. Hence, the normal force sensors can be optimally positioned for detection of the normal force in the axial direction, normal to the surface of said end walls.

In another embodiment thereof the rotation axis extends vertically or substantially vertically, wherein the first end wall is arranged above the rotation element in the axial direction. Preferably, the plurality of normal force sensors are located at or in the first end wall of the container. More preferably, the first end wall is a cover to open and close the container. The sensors are therefore easily accessible for maintenance purposes.

In an alternative embodiment, the one or more normal force sensors are located on the rotation element. The normal force generated by the shearing, polymeric mass is exerted in both directions parallel to the rotation axis, i.e. onto the container and onto the rotation element. The normal force can thus be detected at the container or the rotation element, or optionally even at both.

In another embodiment the one or more normal force sensors are arranged for detecting the component of the normal force in a detection direction that extends in a range of zero to thirty degrees to the rotation axis. The detection direction may be slightly tilted with respect to the rotation axis, in particular when one of the containers and the rotation element does not have a surface that is normal to the rotation axis, i.e. in the case of a cone-shaped rotation element or a cone-shaped container. As long as a component of the normal force can be detected within the specified range, the actual normal force in or parallel to the rotation axis can be calculated using vector resolution.

Alternatively, the one or more normal force sensors are arranged for detecting the normal force in a detection direction parallel to the rotation axis. In this case, the detected normal force substantially corresponds to the actual normal force.

In another embodiment the container is arranged for containing the viscous, polymeric mass at a pressure that is higher than the ambient pressure, wherein one or more of the one or more normal force sensors or a further pressure sensor is arranged for detecting the pressure force exerted by the viscous, polymeric mass onto the container as a result of the pressure of the viscous, polymeric mass when the rotation element is stationary, wherein the measuring device further comprises a control unit that is electronically connected to the one or more normal force sensors, wherein the control unit is arranged for distinguishing the pressure force as a result of the pressure of the viscous, polymeric mass when the rotation element is stationary and the normal force as a result of the rotation of the rotation element. Consequently, the effect of the pressurization, i.e. the base pressure, can be subtracted from the forces detected by the normal force sensor and/or the radial force sensor to accurately determine the contribution of the rotation to the normal force and the radial force detected by the respective sensors.

In another embodiment the first normal force sensor and the second normal force sensors are offset with respect to each other in a circumferential direction about the rotation axis. This can be particularly convenient when the normal force sensors are too large to be physically arranged side-by-side in a single line.

According to a second aspect, the invention provides a method for determining rheological properties of a viscous, polymeric mass with the use of the measuring device according to the first aspect of the invention, wherein the method comprises the steps of:
  filling the container with viscous, polymeric mass;
  pressurizing the viscous, polymeric mass to a pressure higher than the ambient pressure;
  providing a relative rotation between the rotation element and the container to shear the viscous, polymeric mass in the container;
  detecting at least a component of the normal force that is exerted by the shearing, viscous polymeric mass onto the container or the rotation element in the axial direction; and
  detecting the radial force exerted by the viscous, polymeric mass onto the container in the radial direction.

The method and its embodiments relate to the practical implementation of the measuring device according to the first aspect of the invention and its corresponding embodiments and therefore have the same technical advantages, which will not be repeated hereafter.

In a preferred embodiment the rotation element has an outer diameter, wherein the method comprises the step of calculating the normal force exerted onto the container or the rotation element in the axial direction at the outer diameter of the rotation element based on detection signals from the one or more normal force sensors; and
  using the normal force exerted onto the container or the rotation element in the axial direction at the outer diameter and the radial force as parameters for calculating one or more characteristics of the viscous, polymeric mass.

In a further embodiment thereof one of the calculations involves subtracting the radial force based on detection signals from the radial force sensor indicative of said radial force from the normal force exerted onto the container or the rotation element in the axial direction at the outer diameter.

In a further embodiment the one or more characteristics comprise one or more of the 'first normal stress difference' and the 'second normal stress difference'.

In a further embodiment the one or more normal force sensors comprises a first normal force sensor at a first radial distance from the rotation axis and a second normal force sensor at a second radial distance from the rotation axis greater than the first radial distance, wherein the method comprises the step of detecting at least components of the normal force exerted by the shearing, viscous polymeric mass onto the container or the rotation element at the first radial distance and the second radial distance with the use of the first normal force sensor and the second normal force sensor, respectively.

In a preferred embodiment the plurality of normal force sensors further comprises a third normal force sensor at a third radial distance from the rotation axis greater than the second radial distance, wherein the method further comprises the step of detecting at least a component of the normal force that is exerted onto the container or the rotation element in the axial direction at the third radial distance with the use of the third normal force sensor.

In a further embodiment the rotation element has an outer diameter, wherein the method further comprises the step of interpolating or extrapolating the detection signals from the plurality of normal force sensors indicative of the normal force at the respective radial distances from the rotation axis.

In an embodiment thereof the plurality of normal force sensors detects the normal force between the rotation axis and the outer diameter, wherein the method comprises the step of extrapolating the detected normal forces to determine the normal force exerted onto the container or the rotation element in the axial direction at the outer diameter of the rotation element.

In a further embodiment thereof the normal force has an exponential relationship with the radial distances that on a logarithmic scale can be presented as a linear equation with a slope and an intercept, wherein the method comprises the steps of using the normal force detected by the first normal force sensor and the normal force detected by the second normal force sensor to determine the slope and the intercept of the linear equation, and calculating the normal force exerted onto the container or the rotation element in the axial direction at the outer diameter of the rotation element via the linear equation.

In another embodiment the method comprises the steps of:
  detecting a pressure force exerted by the viscous, polymeric mass onto the container as a result of a pressure of the viscous, polymeric mass when the rotation element is stationary; and
  distinguishing the pressure force as a result of the pressure of the viscous, polymeric mass when the rotation element is stationary and the normal force as a result of the rotation of the rotation element.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
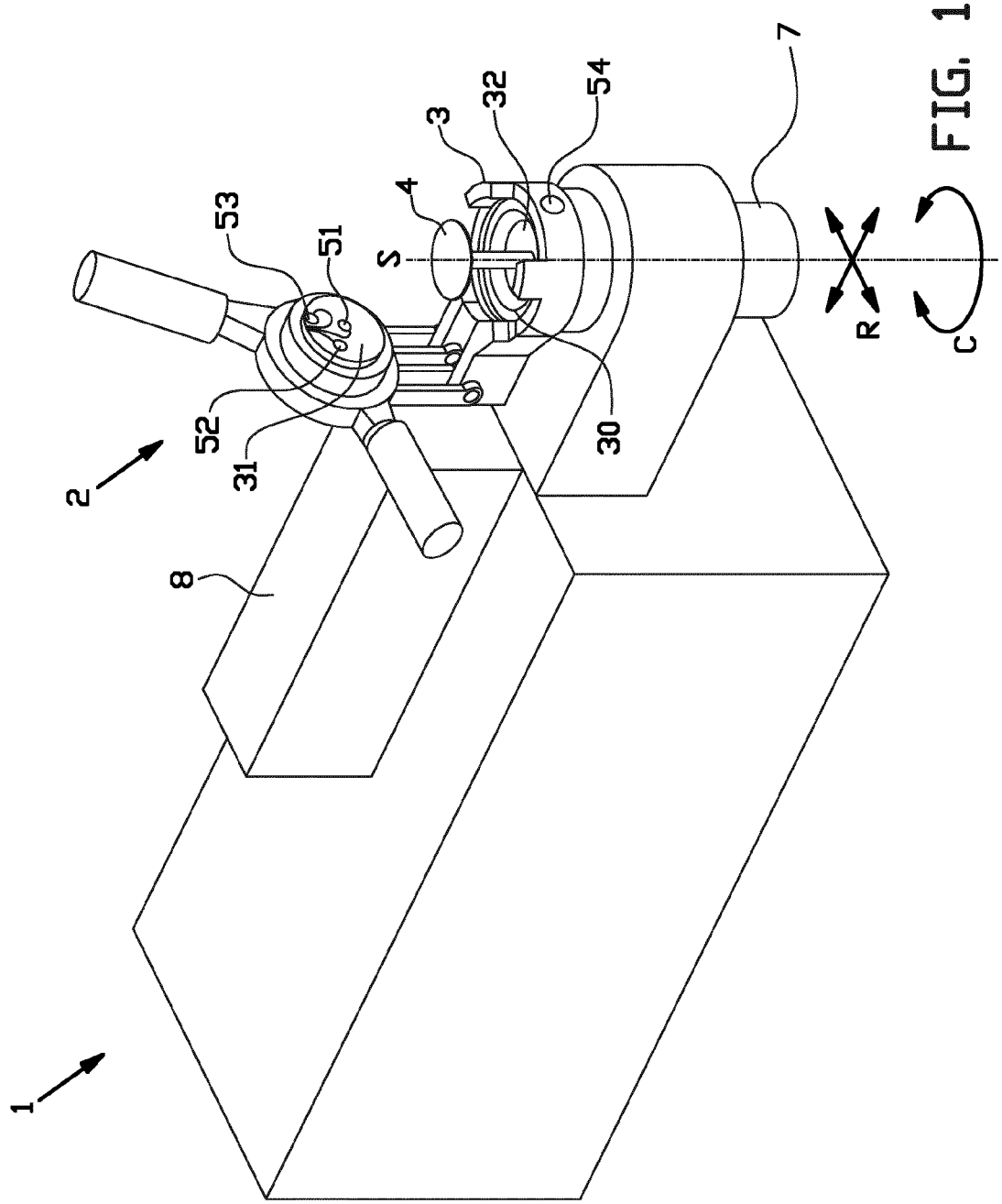
FIG. 1 shows an isometric view of a measuring device according to a first embodiment of the invention.
Figure 2:
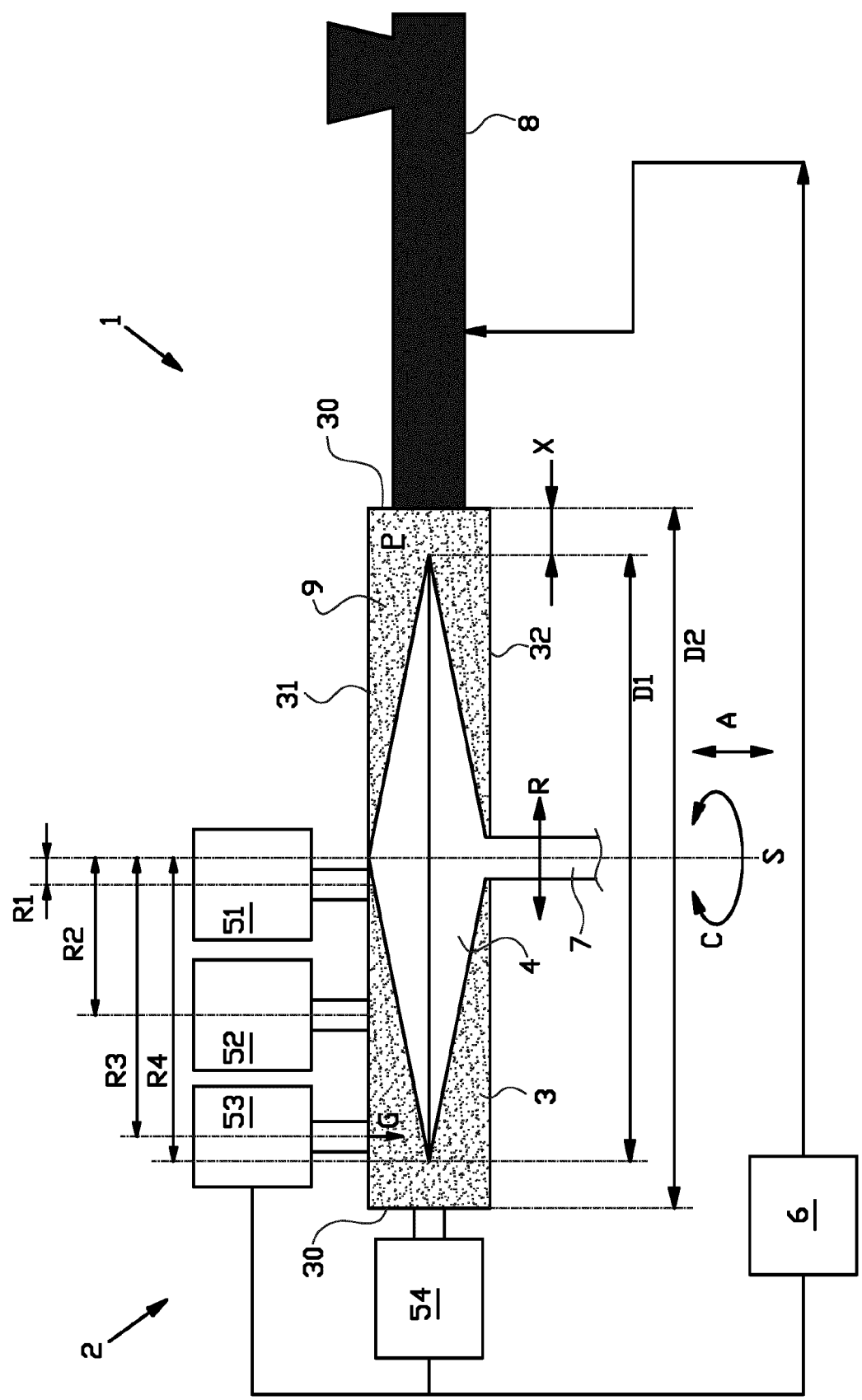
FIG. 2 shows a schematic cross section of the measuring device according to FIG. 1.
Figure 3:
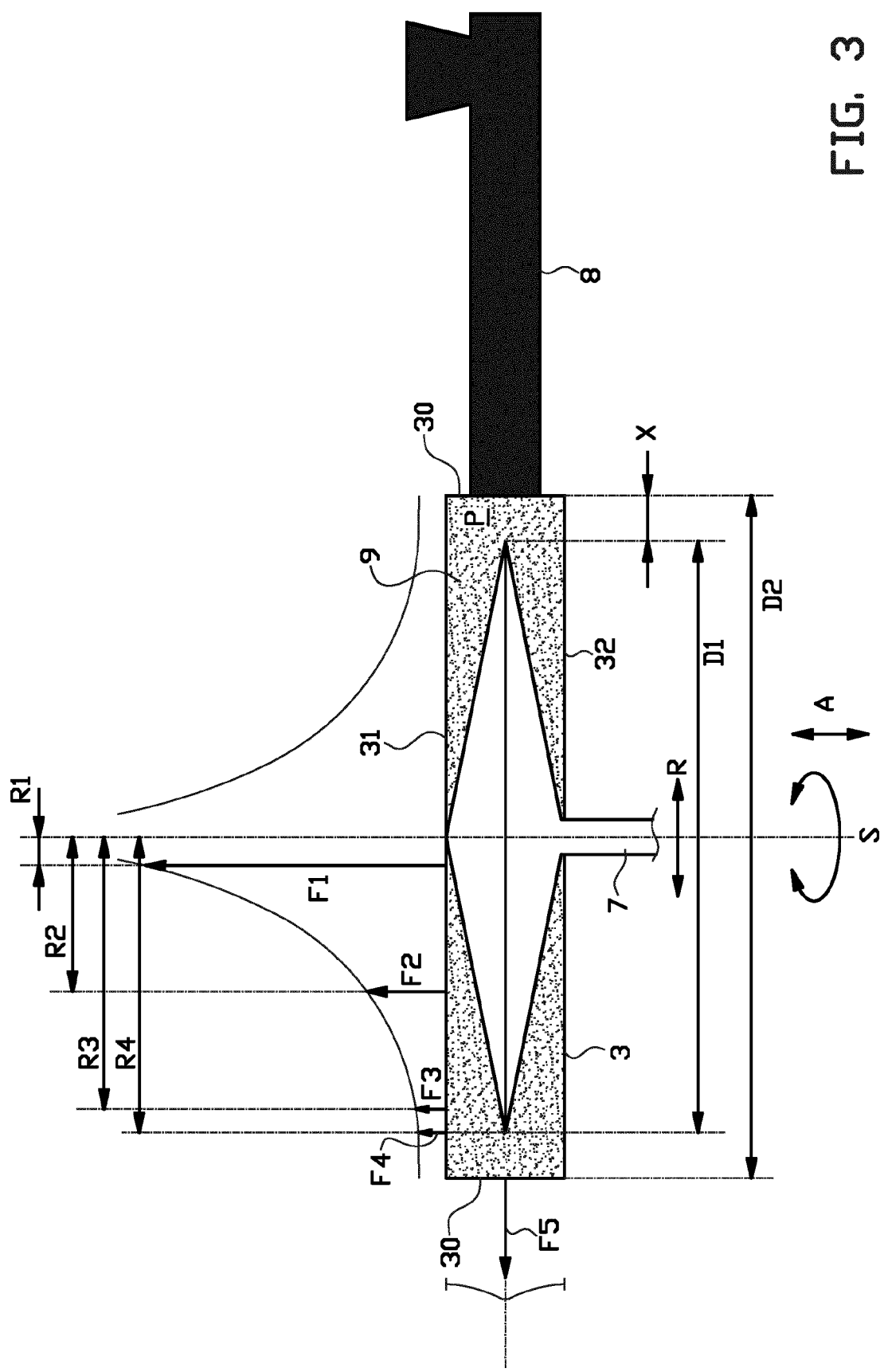
FIG. 3 shows the cross section of FIG. 2 and the forces measured at various positions along said cross section.

FIGS. 1, 2 and 3 show a measuring device 1 for determining rheological properties of a viscous or highly viscous, polymeric mass 9, as shown in FIGS. 2 and 3, according to an exemplary first embodiment of the invention. The measuring device 1 may for example be used to determine, calculate or predict one or more characteristics of an elastomeric material, in particular a rubber compound for use in the tire building industry. Typically, the elastomeric material is tested under different conditions, e.g. at different temperatures or pressures.

As shown in FIG. 1, the measuring device 1 comprises a rotational viscometer or rheometer 2. The rheometer 2 is provided with a chamber or container 3 that defines an inner volume for containing the polymeric mass 9 and a rotation element 4 that is positionable inside the container 3. The measuring device 1 is arranged for providing a relative rotation between the rotation element 4 and the container 3 about a rotation axis S. The rotation axis S defines an axial direction A parallel to the rotation axis S and a radial direction R perpendicular to the rotation axis S. Preferably, the rotation axis S extends vertically or substantially vertically. As such, the rotation element 4 rotates in a horizontal plane. In this exemplary embodiment, the rotation element 4 is driven in a rotation about the rotation axis S to obtain the relative rotation between the rotation element 4 and the container 3. Alternatively, the container 3 may be rotated relative to the rotation element 4, similar to the rotating cylinder that forms the measuring chamber of U.S. Pat. No. 4,173,142 A.

The measuring device 1 further comprises a drive 7 for driving the rotation of the rotation element 4 about the rotation axis S and an extruder 8 that is arranged in fluid communication with the container 3 for feeding the polymeric mass 9 into the container 3 of the rheometer 2. When the container 3 is completely filled with the polymeric mass 9, the extruder 8 is controlled to pressurize polymeric mass 9. In particular, the pressure P of the polymeric mass 9 in the container 3 is raised to a level that is higher than the ambient pressure surrounding the measuring device 1. More in particular, the pressure P is increased to a level in excess of thirty Bar, preferably in excess of fifty Bar and most preferably in excess of one-hundred Bar.

The extruder 8 and/or the rheometer 2 may be further be provided with one or more heating elements (not shown) to control the temperature of the polymeric mass 9. The measuring device 1 may further be provided with a torque transducer or sensor (not shown) to measure the torque exerted on the rotation element 4.

In this exemplary embodiment, the container 3 comprises a circumferential wall 30 extending in a circumferential direction about the rotation axis S. The circumferential wall 30 is circular or substantially circular. The circumferential wall 30 is concentric to the circumference of the rotation element 4. The container 3 further comprises a first end wall 31 that closes the circumferential wall 30 in the axial direction A at one side of the rotation element 4 and a second end surface or wall 32 that closes the circumferential wall 30 in the axial direction A at an opposite side of the rotation element 4. In this exemplary embodiment, the first end surface or wall 31 is arranged above the rotation element 4 in the axial direction A. More in particular, the first end wall 31 is a cover to open and close the container 3, i.e. for maintenance purposes. FIG. 1 shows the cover in the open position. When closed, the position of the cover is fixed relative to the circumferential wall 30 to form a rigid or substantially rigid first end wall 31.

As best seen in FIG. 1, the rotation element 4 has a circular or substantially circular circumference. The circumference defines an outer diameter D1, as shown in FIGS. 2 and 3. Preferably, the outer diameter D1 lies in a range of forty to one-hundred millimeters. In this particular example, the outer diameter D1 is approximately fifty millimeters. In the embodiment as shown, the rotation element 4 is a double-sided cone or double cone. Alternatively, the rotation element 4 may be shaped as a single-sided cone, a single cone or a suitably shaped disc or plate.

As shown in FIGS. 2 and 3, the circumferential wall 30 extends concentrically about the rotation axis S at an inner diameter D2. Preferably, said inner diameter D2 is larger than the outer diameter D1 to form a clearance X between the rotation element 4 and the circumferential wall 30. The clearance X in the radial direction R has a size in the range of two to fifty percent of the outer diameter D1, and more preferably in the range of two to fifteen percent of the outer diameter D1. Based on an outer diameter D1 of the rotation element 4 of approximately fifty millimetres, the size of the clearance (X) in the radial direction (R) ranges from one to twenty-five millimetres, more preferably from one to seven-and-a-half millimetres and most preferably is approximately four millimeters.

The relative rotation or counter-rotation between the rotation element 4 and the container 3 causes shearing or a shear flow in the polymeric mass 9 which stretches the otherwise randomly arranged polymers in the direction of the shearing. The polymers have a tendency to return to their initial random arrangement, which causes stress in the polymeric mass 9, in particular in a direction normal to the direction of the shearing, i.e. in or parallel to the axial direction A. This phenomenon is known as the 'Weissenberg effect'. As a result, a normal force, schematically shown with arrows F1, F2, F3, F4 in FIG. 3, is exerted by the polymeric mass 9 onto the container 3. Said normal force F1, F2, F3, F4 acts in or parallel to the axial direction A onto the container 3, in particular on the first end wall 31 and/or the second end wall 32 thereof.

As shown in FIGS. 1 and 2, the measuring device 1 further comprises a plurality of normal force transducers or sensors 51, 52, 53 for measuring or detecting the normal force F1, F2, F3 exerted onto the container 3 in the axial direction A. The plurality of normal force sensors 51, 52, 53 are located at or in one of the end walls 31, 32 of the container 3. In this exemplary embodiment, the plurality of normal force sensors 51, 52, 53 are located in the first end wall 31, i.e. the cover of the container 3. Hence, the plurality of normal force sensors 51, 52, 53 are easily accessible for maintenance purposes.

Preferably, the measuring device 1 further comprises a radial force transducer or sensor 54 for measuring or detecting a radial force F5 exerted by the polymeric mass 9 onto the container 3 in the radial direction R. The radial force sensor 54 is located at or in the circumferential wall 30.

In this exemplary embodiment, the plurality of normal force sensors 51, 52, 53 and/or the radial force sensor 54 are pressure sensors that measure the force, typically expressed in Newton, per unit area, typically expressed in square meters, resulting in a pressure value, typically expressed in Pascal (Pa) or Bar. The normal force sensors 51, 52, 53 detect the force in a detection direction G normal to the surface area that is being measured. In this exemplary embodiment, the detection direction G is parallel to the rotation axis S and/or the axial direction A.

As shown in FIG. 2, the measuring device 1 further comprises a control unit 6 that is operationally and/or electronically connected to one or more of the plurality of normal force sensors 51, 52, 53 and/or the radial force sensor 54 to receive detection signals from the respective sensors 51, 52, 53, 54 indicative of the forces detected by the respective sensors 51, 52, 53, 54. Preferably, the control unit 6 is further operationally and/or electronically connected to the drive 7 and/or the extruder 8 to control the drive and/or the extruder 8 in response to the detection signals received from the plurality of normal force sensors 51, 52, 53 and/or the radial force sensor 54.

As best seen in FIGS. 1 and 2, at least two of the plurality of normal force sensors 51, 52, 53 are arranged at a different radial distance R1, R2, R3 from the rotation axis S. In particular, in the example as shown, the plurality of normal force sensors 51, 52, 53 comprises a first normal force sensor 51 for detecting the normal force F1 in the axial direction A at a first radial distance R1 from the rotation axis S and a second normal force sensor 52 for detecting the normal force F2 in the axial direction A at a second radial distance R2 from the rotation axis S greater than the first radial distance R1. In this particular example, the plurality of normal force sensors 51, 52, 53 further comprises a third normal force sensor 53 for detecting the normal force F3 in the axial direction A at a third radial distance R3 from the rotation axis S greater than the first radial distance R1.

As best seen in FIG. 1, the first normal force sensor 51 and the second normal force sensors 52 are offset with respect to each other in a circumferential direction C about the rotation axis S. Alternatively, the normal force sensors 51, 52, 53 may be arranged side-by-side in a single line in the radial direction R, provided that they can be physically accommodated within the space available in said radial direction R. In this particular example, the plurality of normal force sensors 51, 52, 53 are all physically located between and/or arranged for detecting the normal force F1, F2, F3 between the rotation axis S and the outer diameter D1 of the rotation element 4.

A method for determining rheological properties of the viscous, polymeric mass 9 with the use of the aforementioned measuring device 1 will be elucidated below with reference to FIGS. 1-5.

FIG. 1 shows the situation in which the container 3 of the measuring device 1 is open for maintenance, i.e. to clean the container 3 after a previous cycle of the method. The cover of the container 3 can be closed to form a closed inner volume of the container 3, as shown in FIGS. 2 and 3. The container 3 is now ready to receive the viscous, polymeric mass 9 from the extruder 8.

When the extruder 8 fills the container 3 with the viscous, polymeric mass 9, the rotation element 4 is kept stationary relative to the container 3. Hence, the 'Weissenberg effect' does not yet occur and the pressure P exerted by the viscous, polymeric mass 9 onto the container 3 should be uniform or substantially uniform in all directions as soon as said mass 9 completely fills the container 3. Subsequently, the extruder 8 may be controlled by the control unit 6 to increase the pressure P of the viscous, polymeric mass 9 to a level greater than the ambient pressure. During this process, one or more of the plurality of normal force sensors 51, 52, 53 and/or radial force sensor 54 may be used to monitor the pressure P in the container 3. Once a preset or predetermined pressure P has been reached, the extruder 8 is kept in its current position so that the pressure P is no longer adjusted by the extruder 8. Subsequently, the pressure force exerted by the polymeric mass 9 onto the container 3 as a result of the pressure P of the polymeric mass 9 is detected when the rotation element 4 is still stationary, i.e. prior to rotation of said rotation element 4. Said pressure P may be stored in a memory or circuitry of the control unit 6 for later reference.

When the rotation element 4 is rotated, the 'Weissenberg effect' causes the viscous, polymeric mass 9 to exert a normal force F1, F2, F3, F4 onto the container 9 in or parallel to the axial direction A. The control unit 6 is arranged for distinguishing the stored pressure force as a result of the pressure P of the polymeric mass 9 when the rotation element 4 is stationary and the normal force F1, F2, F3, F4 as a result of the rotation of the rotation element 4. The control unit 6 may for example subtract or offset the stored pressure force from or with respect to the detection signals from the plurality of normal force sensors 51, 52, 53 to obtain the net contribution of the normal force F1, F2, F3 to the actual force measured at the respective sensors 51, 52, 53.

Using the Navier-Stokes equations, it has been found that the normal force F1, F2, F3, F4 caused by the rotation of the rotation element 4 has an exponential relationship with the radial distances R1, R2, R3, R4. In particular, the normal force F1, F2, F3, F4 is highest close to the rotation axis S and exponentially drops in the radially outward direction, as graphically shown in FIG. 4. The normal force F1, F2, F3, F4 can also be plotted as a function of a natural logarithm (ln) or on a logarithmic scale, which results in linear relationship as shown in FIG. 5. The linear relationship can be defined by a linear equation with a slope (a) and an intercept (b).

The normal force F1, F2, F3, F4 can be used to calculate fluid characteristics of the viscous, polymeric mass, such as the 'first normal stress difference', typically denoted by 'N1', and the 'second normal stress difference', typically denoted by 'N2'. Said 'normal stress differences' are well-known in the field of the tire building to predict the behavior of rubber compounds, in particular die swell. However, the normal force detection has proven to be unreliable because of the effects of pressurization and/or the boundaries of the container 3. The alternative would be to have no boundary, i.e. no circumferential wall 30, in the radial direction R, but then there is no way to contain the pressurized mass 9 and there would be no way to measure the radial force F5.

The measuring device 1 according to the present invention uses the exponential relationship and/or the linear relationship as described above to predict, calculate, interpolate or extrapolate the normal force at any radial distance from the rotation axis S based on a detection of the normal force F1, F2, F3 at a limited number of radial distances R1, R2, R3. In particular, the normal force F1, F2, F3 is detected at a radial position F1, F2, F3 at which the detection is more reliable or less affected by the pressurization or boundaries of the container 3.

In the situation in which the plurality of normal force sensors 51, 52, 53 comprises only the first normal force sensor 51 and the second normal force sensor 52, or the third or further normal force sensors are not used, the normal force at the outer diameter D1 can be predicted, calculated, interpolated and/or extrapolated at any radial distance from the rotation axis S by using the linear relationship as shown in FIG. 5. In particular, the normal force F1 detected by the first normal force sensor 51 and the normal force F2 detected by the second normal force sensor 52 are used to determine the slope (a) and the intercept (b) of the linear equation that underlies the line of FIG. 5.

Figure 4:
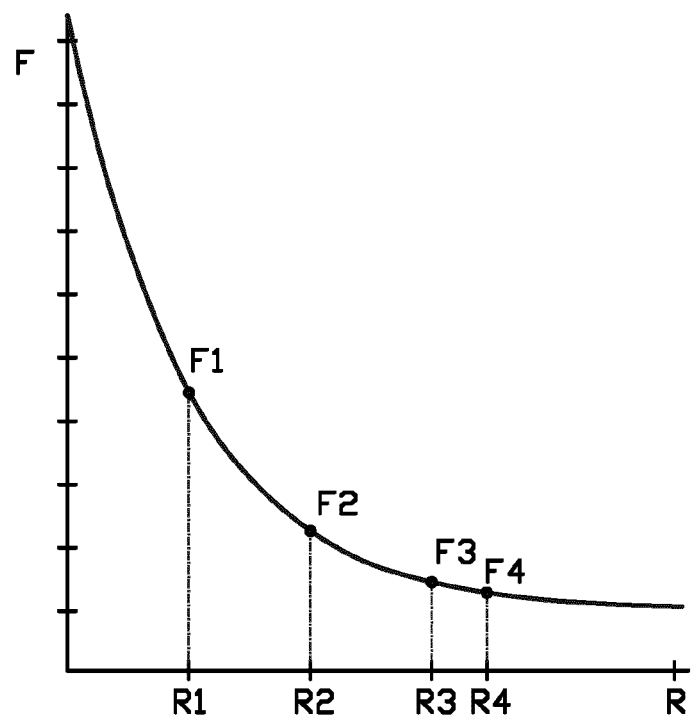
FIG. 4 shows a first graph that illustrates the exponential relationship between normal force and radial distance.
Figure 5:
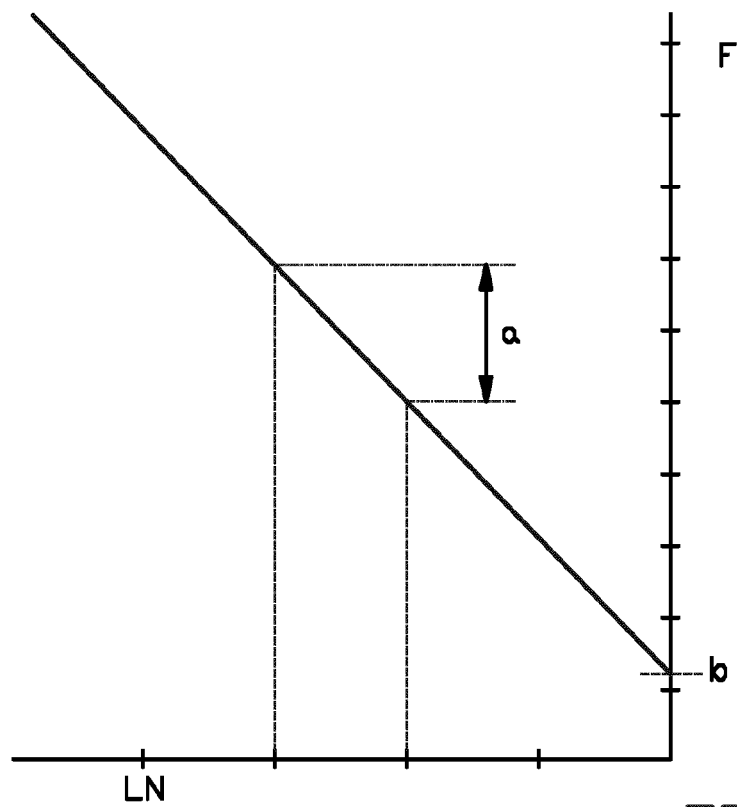
FIG. 5 shows a second graph that illustrates the linear relationship between the normal force and the radial distance of the graph FIG. 4, after conversion via a logarithmic scale.

In the situation in which the plurality of normal force sensors 51, 52, 53 comprises three or more normal force sensors 51, 52, 53, the normal forces F1, F2, F3 detected at the respective normal force sensors 51, 52, 53 are used to determine the exponential relationship that underlies the curve of FIG. 4.

In any of the above situations, the normal force at any radial distance from the rotation axis S can be determined based on the normal forces F1, F2, F3 detected at a limited number of radial distances R1, R2, R3.

Alternatively, the normal force F4 at the outer diameter D1 of the rotation element 4 may be detected directly by a single normal force sensor (not shown), provided that there is enough space to accommodate the single normal force sensor at said location. Also, the detection of the normal force F4 at the outer diameter D1 may be slightly less accurate than the extrapolation thereof because of the normal force F4 being an average of the detection area of the normal force sensor and the negative effects of the polymeric mass 9 slowing down or standing still radially outside of the outer diameter D1.

The normal force F4 at the outer diameter D1 of the rotation element 4, i.e. at the fourth radial distance R4 from the rotation axis S, as shown in FIG. 3, is of particular interest because said normal force F4 is used in the determination of the 'second normal stress difference'. More in particular, the 'second normal stress difference' is calculated by subtracting the radial force F5 based on detection signals from the radial force sensor 54 indicative of said radial force F5 from the normal force F4 exerted onto the container 3 in the axial direction A at the outer diameter D1. The 'second normal stress difference' can subsequently be used to calculate the 'first normal stress difference' in a manner known per se to predict various characteristics of the viscous, polymeric mass 9, in particular die swell.

It has been found that the relative rotation of the rotation element 4 with respect to the container 3 also causes a slight increase in the forces measured in the radial direction R, i.e. by the radial force sensor 54. However, the detection of the radial force F5 in the radial direction R at the radial force sensor 54 is affected by the presence of the circumferential wall 30 and the clearance X between the circumferential wall 30 and the rotation element 4. Yet, when the clearance X becomes too large, a part of the viscous, polymeric mass 9 will rotate slower or stop rotating at all. The clearance X is chosen in a range as previously specified to minimize the effects of the circumferential wall 30 on the detection results of the radial force sensor 54 while preventing the introduction of further negative effects as a result of the viscous, polymeric mass 9 slowing down.

Figure 6:
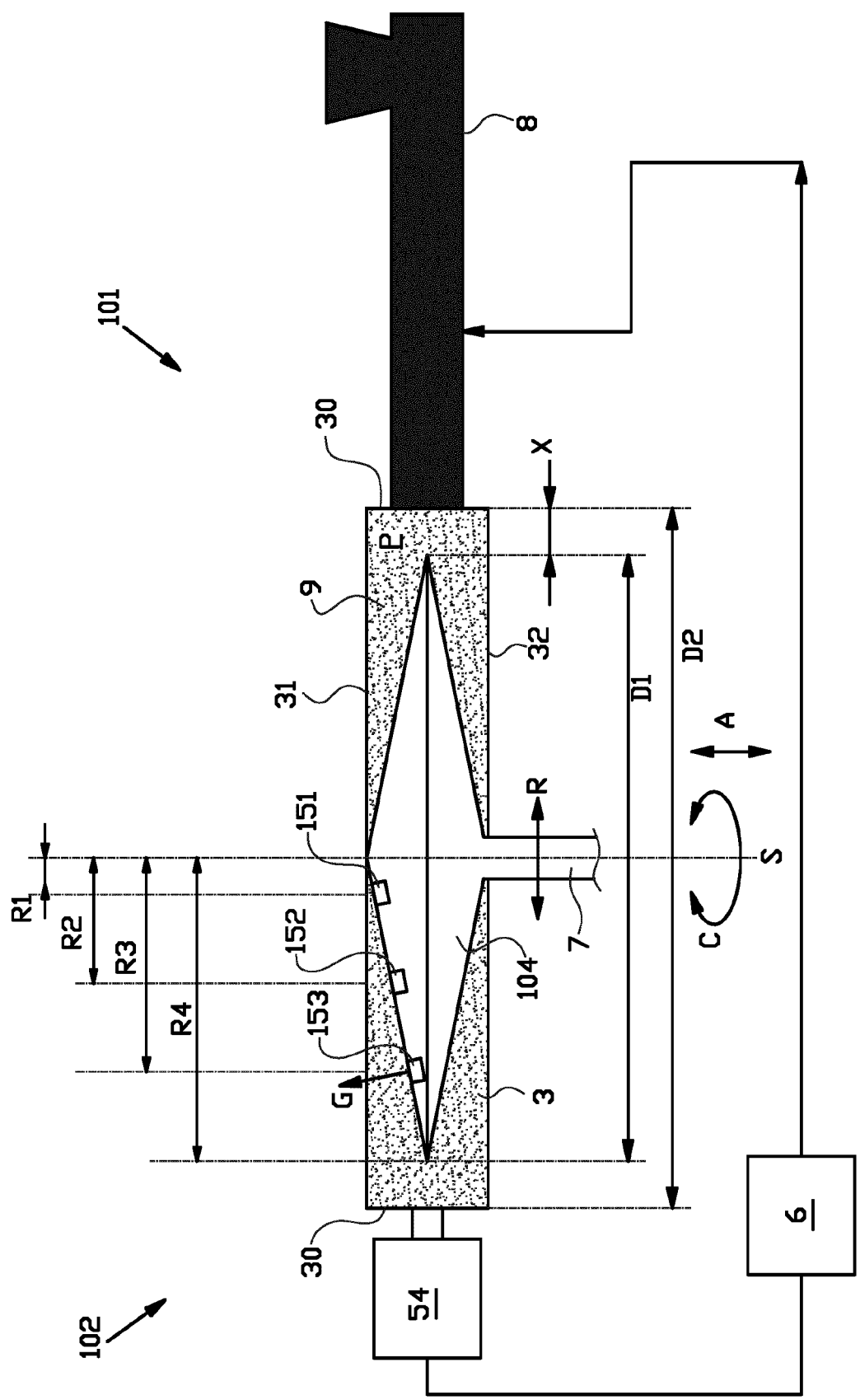
FIG. 6 shows a schematic cross section of an alternative measuring device according to a second embodiment of the invention.

FIG. 6 shows an alternative measuring device 101 according to an exemplary second embodiment of the invention. The alternative measuring device 101 differs from the previously described measuring device 1 in that its viscometer or rheometer 102 comprises normal force sensors 151, 152, 153 that are located at or on the rotation element 104. Consequently, the normal force sensors 151, 152, 153 are arranged for detecting the normal force F1, F2, F3 exerted onto the rotation element 104.

In this example, because the rotation element 104 is slightly cone-shaped, the detection direction G of the normal force sensors 151, 152, 153 is also slightly tilted or offset with respect to the rotation axis S. In particular, the detection direction G is within a range of zero to thirty degrees from the rotation axis S, and preferably within a range of zero to fifteen degrees. Hence, the normal force sensors 151, 152, 153 are arranged for detecting at least a component of the normal force F1, F2, F3 that acts on the rotation element 104 in the axial direction S. In other words, the normal force sensors 151, 152, 153 are arranged for detecting the component of the normal force F1, F2, F3 in the detection direction G, obliquely to the rotation axis S. The control unit 6 may be arranged for calculating the normal force F1, F2, F3 based on the detection signals from the respective normal force sensors 151, 152, 153, i.e. by vector resolution.

Alternatively, the rotation element 104 may be plate-like and instead the container 3 may have cone-shaped end walls (not shown). The normal force sensors 151, 152, 153 may be located in either of the rotation element 104 and the container 3.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a measuring device and a method for determining rheological properties of a viscous, polymeric mass, wherein the measuring device comprises a rheometer with a container containing the mass and a rotation element that is positionable inside the container, wherein the measuring device provides a relative between the rotation element and the container about an rotation axis that defines an axial direction parallel to the rotation axis and a radial direction perpendicular to the rotation axis, wherein the measuring device comprises one or more normal force sensors for detecting at least a component of the normal force that is exerted onto the container or the rotation element in the axial direction and a radial force sensor for detecting a radial force exerted onto the container in the radial direction.

The invention claimed is:

1. A measuring device for determining rheological properties of a viscous, polymeric mass,
 wherein the measuring device comprises a rotational rheometer with a container for containing the viscous, polymeric mass and a rotation element that is positionable inside the container,
 wherein the measuring device is arranged for providing a relative rotation between the rotation element and the container about a rotation axis that defines an axial direction parallel to the rotation axis and a radial direction perpendicular to the rotation axis,
 wherein the measuring device comprises one or more normal force sensors for detecting at least a component of a normal force that is exerted in the axial direction onto the container or the rotation element and a radial force sensor for detecting a radial force exerted onto the container in the radial direction,
 wherein the rotation element has an outer diameter,
 wherein the measuring device further comprises a control unit that is electronically connected to the one or more normal force sensors,
 wherein the control unit is arranged for calculating the normal force exerted onto the container or the rotation element in the axial direction at the outer diameter of the rotation element based on detection signals from the one or more normal force sensors,
 wherein one of the calculations involves subtracting the radial force based on detection signals from the radial force sensor indicative of said radial force from the normal force exerted onto the container or the rotation element in the axial direction at the outer diameter.

2. The measuring device according to claim 1, wherein radial force sensor is located at or in the circumferential wall.

3. The measuring device according to claim 1, wherein the radial force sensor is a pressure sensor.

4. The measuring device according to claim 1, wherein the measuring device is arranged for using the normal force exerted onto the container or the rotation element in the axial direction at the outer diameter and the radial force as parameters for calculating one or more characteristics of the viscous, polymeric mass,
 wherein the one or more characteristics comprise one or more of a 'first normal stress difference' and a 'second normal stress difference'.

5. The measuring device according to claim 1, wherein the one or more normal force sensors are located on the rotation element.

6. The measuring device according to claim 1, wherein the one or more normal force sensors are arranged for detecting the component of the normal force in a detection direction that extends in a range of zero to thirty degrees to the rotation axis.

7. The measuring device according to claim 1, wherein the one or more normal force sensors are arranged for detecting the normal force in a detection direction parallel to the rotation axis.

8. The measuring device according to claim 1, wherein the container is arranged for containing the viscous, polymeric mass at a pressure that is higher than the ambient pressure,
 wherein one or more of the one or more normal force sensors or a further pressure sensor is arranged for detecting the pressure force exerted by the viscous, polymeric mass onto the container as a result of the pressure of the viscous, polymeric mass when the rotation element is stationary,
 wherein the measuring device further comprises a control unit that is electronically connected to the one or more normal force sensors,
 wherein the control unit is arranged for distinguishing the pressure force as a result of the pressure of the viscous, polymeric mass when the rotation element is stationary and the normal force as a result of the rotation of the rotation element.

9. The measuring device according to claim 1, wherein the one or more normal force sensors include a first normal force sensor and a second normal force sensor, and
 wherein the first normal force sensor and the second normal force sensors are offset with respect to each other in a circumferential direction about the rotation axis.

10. The measuring device according to claim 1, wherein the one or more normal force sensors comprises a first normal force sensor for detecting at least a component of the normal force that is exerted in the axial direction onto the container or the rotation element at a first radial distance from the rotation axis and a second normal force sensor for detecting at least a component of the normal force that is exerted in the axial direction onto the container or the rotation element at a second radial distance from the rotation axis greater than the first radial distance.

11. The measuring device according to claim 10, wherein the one or more normal force sensors further comprises a third normal force sensor for detecting at least a component of the normal force that is exerted onto the container or the rotation element in the axial direction at a third radial distance from the rotation axis greater than the second radial distance.

12. The measuring device according to claim 10, wherein the control unit is arranged for calculating the normal force exerted onto the container or the rotation element in the axial direction at the outer diameter of the rotation element by means of interpolation or extrapolation based on detection signals from the plurality of normal force sensors indicative of the normal force at the respective radial distances from the rotation axis.

13. The measuring device according to claim 12, wherein the plurality of normal force sensors are all arranged for detecting the normal force between the rotation axis and the outer diameter,
 wherein the control unit is arranged for calculating the normal force exerted onto the container or the rotation element in the axial direction at the outer diameter of the rotation element by means of extrapolation.

14. The measuring device according to claim 12, wherein the normal force has an exponential relationship with the radial distances that on a logarithmic scale can be presented as a linear equation with a slope and an intercept,
 wherein the control unit is arranged for using the normal force detected by the first normal force sensor and the normal force detected by the second normal force sensor to determine the slope and the intercept of the linear equation, wherein the control unit is further arranged for calculating the normal force exerted onto the container or the rotation element in the axial direction at the outer diameter of the rotation element via the linear equation.

15. The measuring device according to claim 1, wherein the rotation element has an outer diameter,
wherein the container comprises a circumferential wall extending concentrically about the rotation axis,
wherein the circumferential wall of the container has an inner diameter concentric to the outer diameter of the rotation element,
wherein the inner diameter is larger than the outer diameter to form a clearance between the rotation element and the circumferential wall.

16. The measuring device according to claim 15, wherein the clearance in the radial direction has a size in the range of two to fifty percent of the outer diameter.

17. The measuring device according to claim 15, wherein the clearance in the radial direction has a size in the range of two to fifteen percent of the outer diameter.

18. The measuring device according to claim 15, wherein the clearance in the radial direction has a size in the range of one to five millimeters.

19. The measuring device according to claim 1, wherein the container comprises a first end wall that closes the circumferential wall in the axial direction at one side of the rotation element and a second end wall that closes the circumferential wall in the axial direction at an opposite side of the rotation element, wherein each one of the one or more normal force sensors is located at or in one of the end walls of the container.

20. The measuring device according to claim 19, wherein the rotation axis extends vertically,
wherein the first end wall is arranged above the rotation element in the axial direction.

21. The measuring device according to claim 20, wherein the one or more normal force sensors are located at or in the first end wall of the container.

22. The measuring device according to claim 21, wherein the first end wall is a cover to open and close the container.

23. The method for determining rheological properties of a viscous, polymeric mass with the use of the measuring device according to claim 1, wherein the method comprises the steps of:
filling the container with the viscous, polymeric mass;
pressurizing the viscous, polymeric mass to a pressure higher than the ambient pressure;
providing a relative rotation between the rotation element and the container to shear the viscous, polymeric mass in the container;
detecting at least a component of the normal force that is exerted by the shearing, viscous polymeric mass onto the container or the rotation element in the axial direction; and
detecting the radial force exerted by the viscous, polymeric mass onto the container in the radial direction,
wherein the rotation element has an outer diameter,
wherein the method comprises the step of calculating the normal force exerted onto the container or the rotation element in the axial direction at the outer diameter of the rotation element based on detection signals from the one or more normal force sensors; and
using the normal force exerted onto the container or the rotation element in the axial direction at the outer diameter and the radial force as parameters for calculating one or more characteristics of the viscous, polymeric mass,
wherein one of the calculations involves subtracting the radial force based on detection signals from the radial force sensor indicative of said radial force from the normal force exerted onto the container or the rotation element in the axial direction at the outer diameter.

24. The method according to claim 23, wherein the one or more characteristics comprise one or more of a 'first normal stress difference' and a 'second normal stress difference'.

25. The method according to claim 23, wherein the method comprises the steps of:
detecting a pressure force exerted by the viscous, polymeric mass onto the container as a result of a pressure of the viscous, polymeric mass when the rotation element is stationary; and
distinguishing the pressure force as a result of the pressure of the viscous, polymeric mass when the rotation element is stationary and the normal force as a result of the rotation of the rotation element.

26. The method according to claim 23, wherein the one or more normal force sensors comprises a first normal force sensor at a first radial distance from the rotation axis and a second normal force sensor at a second radial distance from the rotation axis greater than the first radial distance,
wherein the method comprises the step of detecting at least components of the normal force exerted by the shearing, viscous polymeric mass onto the container or the rotation element at the first radial distance and the second radial distance with the use of the first normal force sensor and the second normal force sensor, respectively.

27. The method according to claim 26, wherein the plurality of normal force sensors further comprises a third normal force sensor at a third radial distance from the rotation axis greater than the second radial distance,
wherein the method further comprises the step of detecting at least a component of the normal force that is exerted onto the container or the rotation element in the axial direction at the third radial distance with the use of the third normal force sensor.

28. The method according to claim 26, wherein the method further comprises the step of interpolating or extrapolating the detection signals from the plurality of normal force sensors indicative of the normal force at the respective radial distances from the rotation axis.

29. The method according to claim 28, wherein the plurality of normal force sensors detect the normal force between the rotation axis and the outer diameter,
wherein the method comprises the step of extrapolating the detected normal forces to determine the normal force exerted onto the container or the rotation element in the axial direction at the outer diameter of the rotation element.

30. The method according to claim 28, wherein the normal force has an exponential relationship with the radial distances that on a logarithmic scale can be presented as a linear equation with a slope and an intercept, wherein the method comprises the steps of using the normal force detected by the first normal force sensor and the normal force detected by the second normal force sensor to determine the slope and the intercept of the linear equation, and calculating the normal force exerted onto the container or the rotation element in the axial direction at the outer diameter of the rotation element via the linear equation.

* * * * *